United States Patent [19]
Morgan

[11] Patent Number: 5,172,526
[45] Date of Patent: Dec. 22, 1992

[54] SHELTER

[76] Inventor: Melvin L. Morgan, 100 N. Pacific Hwy., #108, Talent, Oreg. 97540-9505

[21] Appl. No.: 694,503

[22] Filed: May 2, 1991

[51] Int. Cl.$^5$ .............................. E04H 15/32
[52] U.S. Cl. ........................ 52/79.5; 52/36; 135/87; 135/95; 135/97; 403/252
[58] Field of Search ........... 52/36, 79.5, 127.1, 52/272; 135/87, 90, 95, 97; 403/252, 261, 256, 374

[56] References Cited

U.S. PATENT DOCUMENTS

| | | | |
|---|---|---|---|
| 2,485,914 | 10/1949 | Owens | 52/36 X |
| 2,492,198 | 12/1949 | Smith | 52/36 |
| 2,670,986 | 3/1954 | Presnell | 52/71 |
| 2,883,713 | 4/1959 | Zug | 52/71 |
| 3,606,406 | 9/1971 | Walters | 403/261 X |
| 3,817,641 | 6/1974 | Steele et al. | 403/256 |
| 4,531,698 | 7/1985 | Sharber | 52/36 X |
| 4,860,778 | 8/1989 | Pohl | 135/97 |

FOREIGN PATENT DOCUMENTS

1006396  4/1952  France .................. 403/261

Primary Examiner—Richard E. Chilcot, Jr.
Assistant Examiner—Kien T. Nguyen
Attorney, Agent, or Firm—John F. Ingman

[57] ABSTRACT

A shelter is formed of readily portable components. Wall members are attached by ear-like projections extending from edges thereof which penetrate slots formed in adjacent wall members. Perforations in the projections accept tapered pegs for securing wall members together. Elongated furniture members, including bed support beams and shelf and table members, extend between and provide structural support to opposing walls by projections extending from their ends which penetrate slots formed in the walls and which are secured in place by tapered pegs. The tapered pegs include a flattened side at their tapered ends which facilitates insertion and maintains the head of the peg away from the wall members.

22 Claims, 4 Drawing Sheets

SHELTER

BACKGROUND OF THE INVENTION

1. Field of the Invention

This invention involves a shelter, and, more particularly, a quickly assembled shelter involving ear, slot, and peg construction wherein furniture members provide structural support.

2. Description of the Prior Art

Various pre-manufactured shelters have been designed and manufactured. Such shelters generally are both heavy and bulky to transport, and difficult and unwieldy to assemble or disassemble, making their use generally undesirable.

What is needed is a pre-manufactured structure which:

a. utilizes lightweight components which are readily assembled and disassembled by one person;

b. when disassembled, may be formed into a compact package for storage and transportation, fitting into a standard size pickup bed;

c. provides a comfortable and sturdy shelter having an off-the ground bed, storage shelving and a table; and d. is appropriate as a temporary shelter where a shelter more sturdy, durable, and comforable than a tent is desired, as for recreational uses like camping, hunting, fishing, and skiing, for construction site lodging, disaster emergency housing, or for military use.

SUMMARY OF THE INVENTION

The present invention provides a shelter which meets the aforementioned needs.

In the preferred embodiment, the shelter includes a first side wall member and a second side wall member, each having a plurality of vertically disposed slots formed in series proximate both of their vertical side edges. A first front wall member and a first back wall member each have a plurality of ear-like projections, extending from a side edge, which are formed and positioned thereon to engage through the vertically disposed slots of the side wall members. The projections each have a perforation formed therein through which a tapered peg may be inserted. When interconnected by the projections extending through the slots and tapered pegs inserted into the perforations of the projections, the first side wall member is drawn against and locked to the first front wall member and the first back wall member in a general U-shape. The first front wall member and the first back wall member additionally each have a horizontal series of slots formed therein with the slots in the first front wall member corresponding to and directly opposing the slots in the first back wall member. Each of, preferably three, elongated bed support beams has ear-like projections opposingly extending from its two ends, with such projections being formed with a perforation through which a tapered peg may be inserted. When an elongated bed support beam has its projections inserted through the opposing slots in the first front wall member and the first back wall member so that the beam horizontally extends between the first front and back wall members, and tapered pegs are inserted into the perforations of the projections, the bed support beam will be locked into such position against and between the members, thereby providing lateral support to the structure as well as multi-beam support for a bed within the structure.

A second front wall member, preferably having a door formed therein, and a second back wall member each also have a plurality of ear-like projections extending from an outer side edge which are formed and positioned thereon to engage through the vertically disposed slots formed proximate the vertical side edges of the second side wall member. As with the first front and back wall members, the projections each have a perforation formed therein through which a tapered peg may be inserted. When interconnected by the projections extending through the slots and tapered pegs inserted into the perforations of the projections, the second side wall member will be drawn against and locked to the second front wall member and the second back wall member.

The second front wall member and the second back wall member each additionally have a plurality of slots formed therethrough. An elongated table member and an elongated shelf member each have at least one ear-like Projection extending from each of their two ends, such projection being formed with a perforation through which a tapered peg may be inserted. When the elongated table member and the elongated shelf member have their projections inserted through the slots in the second front wall member and the second back wall member so as to extend between the second front wall member and the second back wall member, and a tapered peg is inserted into each perforation of the projections, the elongated table member and the elongated shelf member will be locked into position against and between the second front wall member and the second back wall member, thereby also providing lateral support to the structure as well as support for the table and the shelf within the structure.

A first center pole is attached to extend vertically along the length of an inner side edge of the second front wall member, and a second center pole is attached to extend vertically along the length of the inner side edge of said second back wall member. A third front wall member and a third back wall member, each substantially triangular in shape and preferably having a window formed therein, are attached along their bottom sides to the top sides of the first front and back wall members, respectively, so that the inner side edges of the first front and back wall members and the vertical side edges of the third front and back wall member combine to form continuous side edges which abut and are attached to the center poles, respectively. A top ridge pole is attached to the upper ends of the two center poles and extends horizontally therebetween for support of the roof. A side ridge pole may also be used, which is attached in notches formed in the slanted edges of the third front and back wall members and which extends horizontally therebetween for additional roof support. Eave poles additionally may be attached to the top edge of each of the two side wall members. The roof, preferably formed of a waterproof cloth or plastic material, is supported by the top ridge pole, side ridge pole, and eave poles, and may be held down by elastic cords affixed to the wall members. Bottom strips may be attached to the bottom edges of the front and back wall members and the side walls, the bottom strips having holes formed therein so as to permit attachment, as by stakes, of the shelter to a fixed ground location.

Two planar bed members, the second being a reflection of the first, may be formed to lay upon the elongated bed support beams within the shelter.

The tapered pegs preferably are formed of dowel material of a diameter substantially equal to the diameter of the perforations in the ear-like projections, with the cylindrically-shaped dowel being flattened to an angle of approximately ten degrees from the longitudinal axis, so that upon insertion, the head of the tapered peg will remain at a distance from the wall member being secured by the wedging effect of the peg.

Means for sealing, against weather, the slots formed in a wall member through which a projection is inserted may be provided. For a bed support beam, an 0-ring type flexible sealing member is installed between the outer end of the beam and around the projection, the encircling flexible sealing member being pressed or forced tightly against a wall member by the locking action of the tapered peg. Where a wall to wall juncture is formed, such as between front and back wall members to side members, a flexible U-shaped bead sealing strip, having holes formed therein to allow the projections to extend therethrough, is positioned along a projection-carrying edge so as to form a seal along that edge and to surround each projection at its base as the member is pressed or forced against the slotted member by the wedging action of the tapered peg.

DESCRIPTION OF THE PREFERRED EMBODIMENT

Turning now to the drawings, there is shown in FIGS. 1 through 4 various views of a shelter 10 which has been constructed. FIGS. 8 through 15 illustrate views of certain components.

In the preferred embodiment, the shelter 10 includes a first side wall member 12 and a second side wall member 14 which are identical in construction, each having preferably three vertically disposed slots 16 formed in series proximate their side edges 18. A first front wall member 20 and a first back wall member 22, each have preferably three ear-like projections 24 which extend from an outer side edge 26, 28 of the first front a back wall members 20 and 22, respectively. The ear-like projections 24 are formed and positioned on the outer side edges 26 and 28 to engage through the vertically disposed slots 16 formed on the side wall members 12 and 14. The projections 24 each have a perforation 30 formed therein, through which a tapered peg 32 may be inserted. When interconnected by the projections 24 extending through the slots 16, and tapered pegs 32 inserted into the perforations 30 of the projections 24, the first side wall member 12 will be drawn against and locked to the first front wall member 20 and the first back wall member 22 in a general U-shape. The side wall members 12 and 14, as well as other wall members, are preferably formed of semi-rigid panel board which has some flexibility. Thus the outer side edges 26 and 28 of the first front and back wall members 20 and 22 may be slightly curved, as with a fifteen foot radius, so that in drawing and locking the side wall member 12 against the side edges 26 and 28, the side wall member 12 may become correspondingly curved, adding strength and rigidity to the structure.

Figure 4:
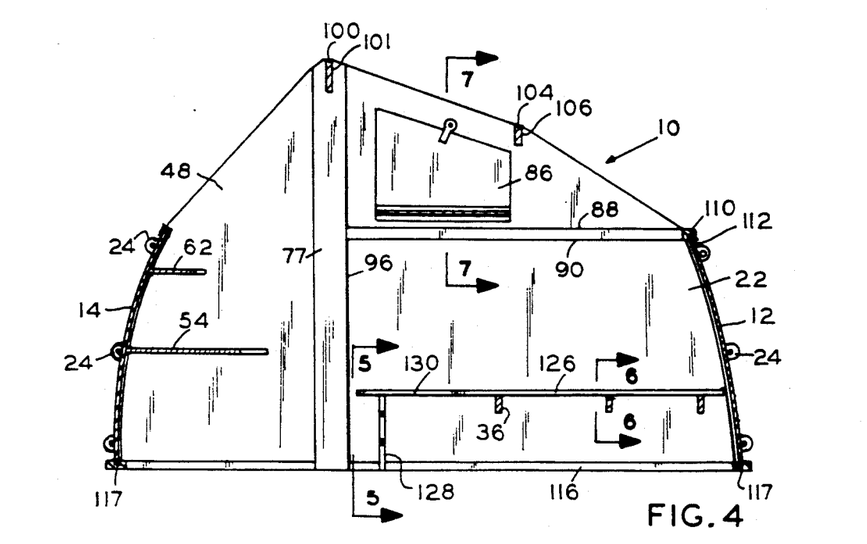
FIG. 4 illustrates a cross-sectional side view of the shelter of FIG. 2.
Figures 8, 9, 10, 11, 12, 13, 14:
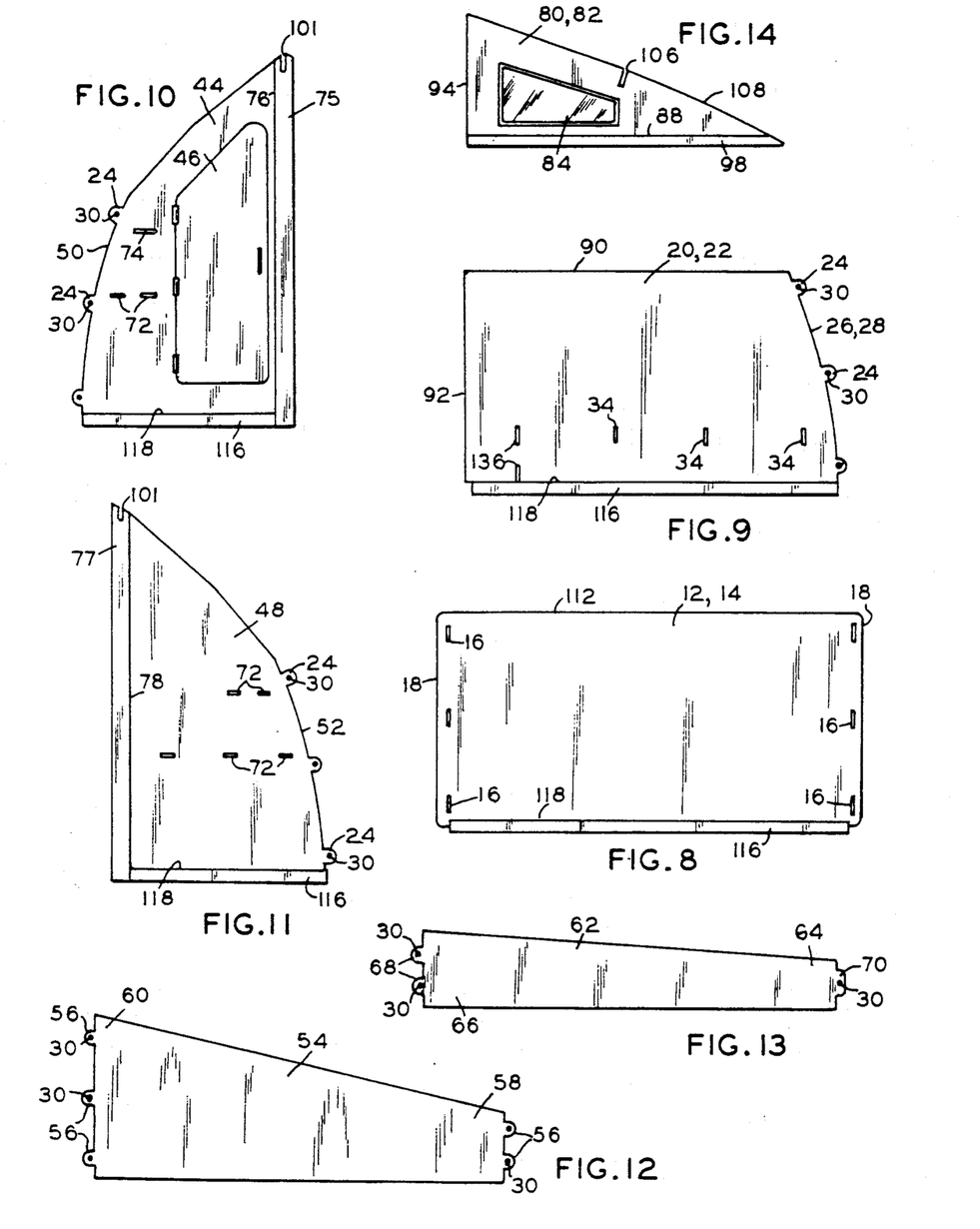
FIG. 8 illustrates a side elevation view of a side wall member.
FIG. 9 illustrates a side elevation view of a first wall member used either at the front or the back of the shelter.
FIG. 10 illustrates a side elevation view of a second front wall member, with door and center pole.
FIG. 11 illustrates a side elevation view of a second back wall member with center pole.
FIG. 12 illustrates a plan view of a table member.
FIG. 13 illustrates a plan view of a shelf member.
FIG. 14 illustrates a side elevation view of a third wall member used at either the front or back of the shelter.
Figure 15:
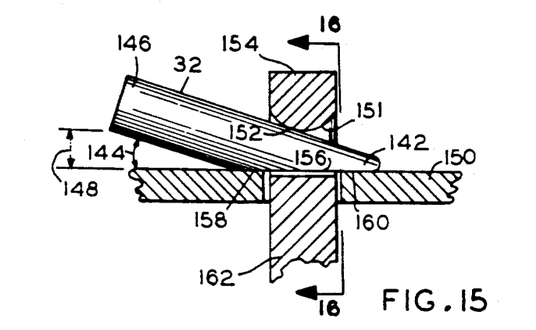
FIG. 15 illustrates a cross sectional side elevation view of a tapered peg inserted through an ear-like projection.

The first front wall member 20 and the first back wall member 22 additionally each have a horizontal series of slots 34 formed therein, with the slots 34 in the first front wall member 20 corresponding to and directly opposing the slots 34 in the first back wall member 22. Each of preferably three elongated bed support beams 36 has ear-like projections 38, similar to projections 24, which extend from its ends 40 and 42, with the projections 38 also being formed with a perforation 30 through which a tapered peg 32 may be inserted. When a bed support beam 36 has its projections 38 inserted through the opposing slots 34 in the first front wall member 20 and the first back wall member 22, so that the bed support beam 36 horizontally extends between the first front and back wall members 20 and 22, and tapered pegs 32 are inserted into the projections 38, the bed support beam 38 will be locked into this position, thus providing lateral support between the first front and back wall members 20 and 22 as well as multi-beam support for an off-the-ground bed within the structure.

A second front wall member 44, preferably having a door 46 formed therein, and a second back wall member 48, each has, similarly to the first front and back wall members 20 and 22, a plurality of ear-like projections 24 extending from an outer side edge 50 and 52, respectively, which are formed and positioned thereon to engage through the vertically disposed slots 16 formed proximate the vertical side edges 18 of the second side wall member 14. Again, perforations 30 are formed in the projections 24 through which a tapered peg 32 may be inserted. Interconnection by the projections 24 extending through the slots 16, and insertion of tapered pegs 32, draws and locks the second side wall member 14 against the second front wall member 44 and the second back wall member 48.

An elongated table member 54, as best seen at FIG. 12, is formed with ear-like projections 56 at its two ends 58 and 60. The table member 54 preferably is tapered toward the narrower end 58 which is designed to be located near the door 46 of the second front wall member 44 so that its reduced width provides more room for access through the door 46. Thus, two ear-like projections 56 are located at end 58 and three such projections 56 are located at the wider end 60. Similarly, an elongated shelf member 62, seen at FIG. 13, to be Positioned above the table member 54, is also somewhat tapered toward a narrower end 64, which is positioned near the door 46. Two ear-like projections 68 are located at the wider end 66 while a single projection 70, preferably somewhat wider than the projections 68, is located at the narrow end 64 of the shelf member 62. The projections 56, 68, and 70, all are formed with a perforation 30 to accept a tapered peg 32. The second front wall member 44 and the second back wall member 48 have opposingly horizontally disposed slots 72 and 74 to accomodate the projections 56, 68, and 70, with the slot 74 being longer for the wider projection 70. When the table member 54 and the shelf member 62 have their projections 56, 68, and 70, inserted through the slots 72 and 74, so that the table member 54 and the shelf member 62 extend horizontally between the second front wall member 44 and the second back wall member 48, and a tapered peg 32 is inserted into the perforations 30 of the projections 56, 68, and 70, the table member 54 and the shelf member 62 will be locked into position against and between the second front wall member 44 and the second back wall member 48 so as to provide lateral support to the second front and back wall members 44 and 48 as well as support for a built-in table 54 and shelf 62 within the shelter 10.

Figure 7:
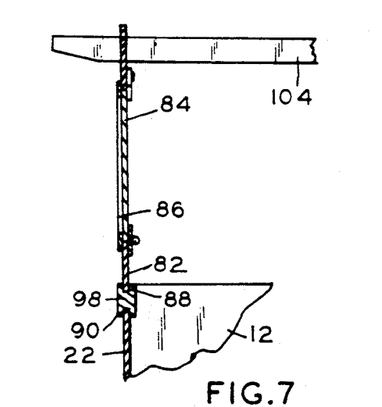
FIG. 7 illustrates a cross-sectional view of a portion of the back wall as seen at line 7—7 of FIG. 4.

A first center pole 75, having opposing longitudinal grooves 188 and 190, is attached as with glue within groove 188, to the second front wall member 44 so as to extend vertically along its inner side edge 76, while n second center pole 77 is attached similarly to extend vertically along the inner side edge 78 of the second back wall member 48. A third front wall member 80 and a third back wall member 82, which may be formed identically with each being substantially triangular in shaped and preferably having a window opening 84 with hinged window cover 86 formed thereon, are attached along their bottom edges 88 to the top edges 90 of the first front and back wall members 20 and 22, respectively, so that the inner side edges 92 of the first front and back wall members 20 and 22 and the vertical side edges 94 of the third front and back wall members 80 and 82, respectively, combine to form a continuous vertical side edge 96 which in assembly of the shelter 10, is attached, as by T-nuts and screws, within the groove 190 of the first and second center poles 75 and 77. The attachment of the bottom edges 88 of the third front and back wall members 80 and 82 to the top edges 90 of the first front and back wall members 20 and 22 may be accomplished by using a strip 98 which is opposingly and longitudinally grooved, as best seen in FIG. 7.

Figure 1:
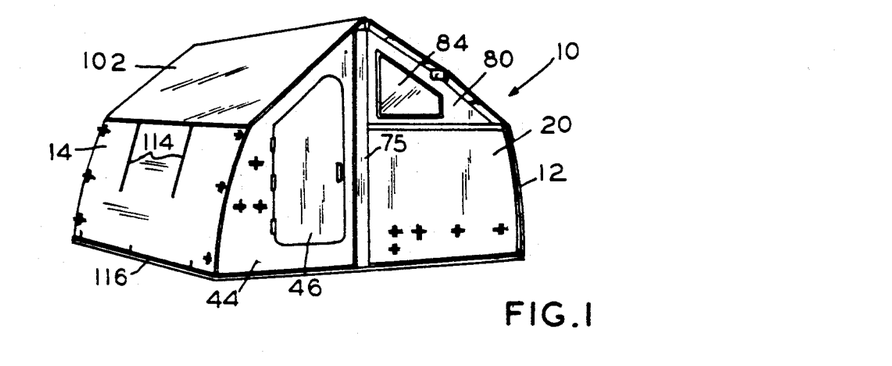
FIG. 1 illustrates a perspective view of the shelter with a roof.
Figure 2:
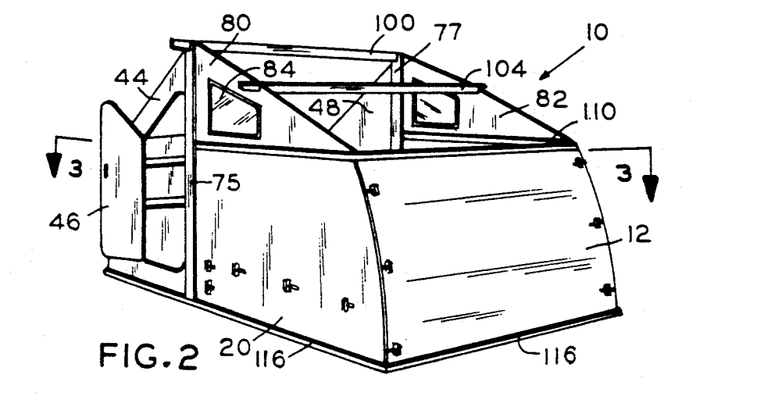
FIG. 2 illustrates a second perspective view of the shelter, with roof removed.
Figure 3:
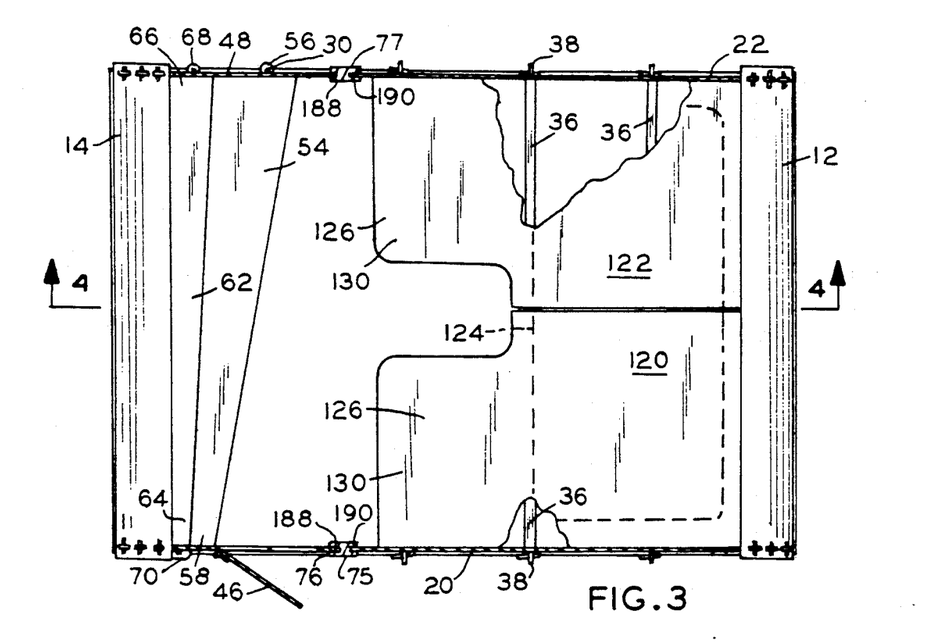
FIG. 3 illustrates a cross-sectional plan view as seen at line 3—3 of FIG. 2.

A top ridge pole 100 is attached within notches 101 formed at the upper ends of the first and second center poles 75 and 77 so as to extend horizontally therebetween for support of the roof 102. A side ridge pole 104 may also be used, which is attached in notches 106 formed in the slanted edges 108 of the third front and back wall members 80 and 82, so as to extend horizontally between the front and back wall members 80 and 82 for additional roof 102 support. Eave poles 110 additionally may be attached to the top edge 112 of the side wall members 12 and 14. The roof 102, preferably formed of a waterproof cloth or plastic material, is supported by the top ridge pole 100, side ridge pole 104 and eave poles 110 and may be held down by elastic cords 114 affixed to the various wall members. Bottom strips 116 having a single longitudinal groove 117 may be affixed to the bottom edges 118 of the side, front, and back wall members, 12, 14, 20, 22, 44, and 48, the bottom strips 116 having vertical holes (not shown) formed therein so as to permit attachment, as by bolts or stakes, of the shelter 10 to a fixed ground location or other base.

Figure 5:
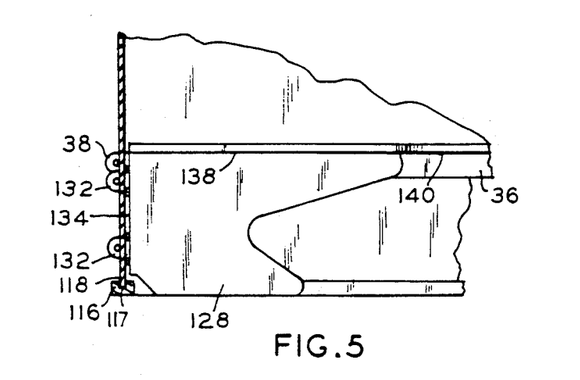
FIG. 5 illustrates a bed support as seen at line 5—5 of FIG. 4.
Figure 6:
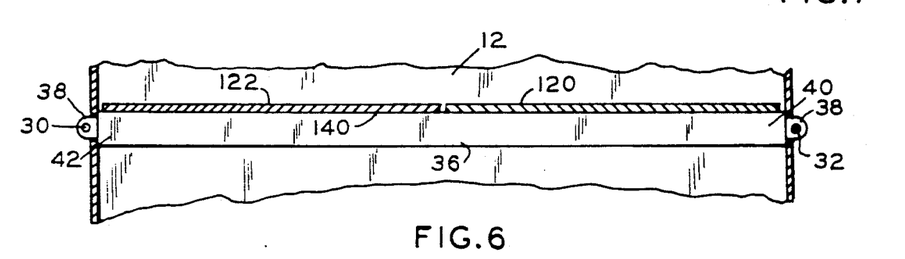
FIG. 6 illustrates a side view of a bed support beam and the two planar bed members, as seen at line 6—6 of FIG. 4.

Two planar bed members 120 and 122, the second bed member 122 being a reflection of the first bed member 120, are formed to lay upon the bed support beams 36 within the shelter 10 wherein a double bed, indicated at 124 in dashed lines, may be formed to lie parallel and adjacent to the first side wall member 12 or, alternatively, two single beds 126 may be formed, one lying parallel and adjacent to the first front wall member 20 and the second lying parallel and adjacent to the first back wall member 22 with remaining space to be used as a night stand. An additional bed support member 128 may be formed, as best seen in FIG. 5, to support the extending end 130 of the bed members 120, 122. Such bed support member 128 includes a pair of ear-like projections 132 extending from its vertical edge 134 as to engage with a pair of additional vertically disposed slots 136 formed in the first front and back wall members 12, 14, so that, with insertion of the tapered pegs 32, the bed support member 128 is locked into position with its top edge 138 horizontally aligned with the top edges 140 of the bed support beams 36.

Figure 16:
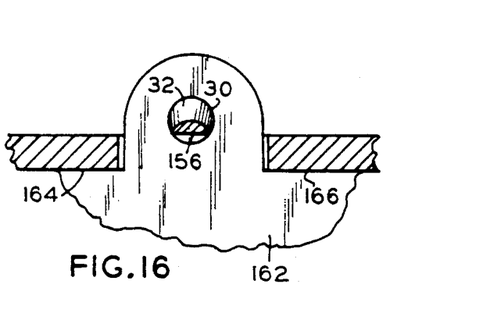
FIG. 16 illustrates a cross sectional view of a tapered peg inserted through an ear-like projection, as seen at line 16—16 of FIG. 15.

The tapered pegs 32, preferably are formed of hardwood dowel material of approximately 182-inch diameter, substantially equal to the diameter of the perforations 30 in the projections 24, 38, 56, 68, 70, and 132. Each tapered peg 32 is approximately four-inches in length and the cylindrically shaped dowel material is flattened on the inserted end 142 to an angle 144 of approximately 10 degrees from its longitudinal axis so that, upon insertion, the head 146 of the tapered peg 32 will remain at a distance 148 from the member 150 being secured by the wedging effect of the peg 32, which distance 148 is convenient for continued insertion or removal. The perforations 30 preferably are formed with a rounded upper inner surface 151 which enhances insertion and contact 152 by the peg 32. The wedging effect of the tapered peg 32 may be seen in FIG. 15 in the contact at 152 by the peg 32 with the ear-like projection 154 so that the flattened surface 156 of the peg 32 bears forcefully upon member 150 at 158 and 160, pressing member 150 against the projection-carrying member 162 at 164 and 166, as seen in FIG. 16.

Figure 17:
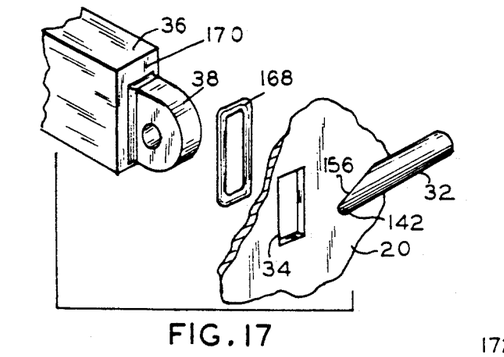
FIG. 17 illustrates an exploded perspective view of wall member attachment to a beam, utilizing an 0-ring type flexible sealing member.
Figure 18:
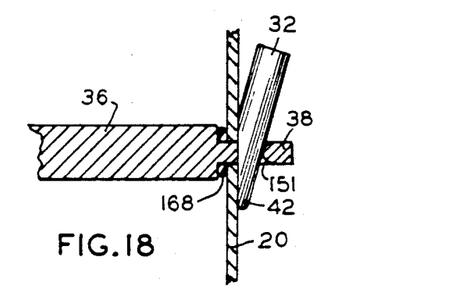
FIG. 18 illustrates a cross sectional view of the wall member to beam attachment of FIG. 17.
Figure 19:
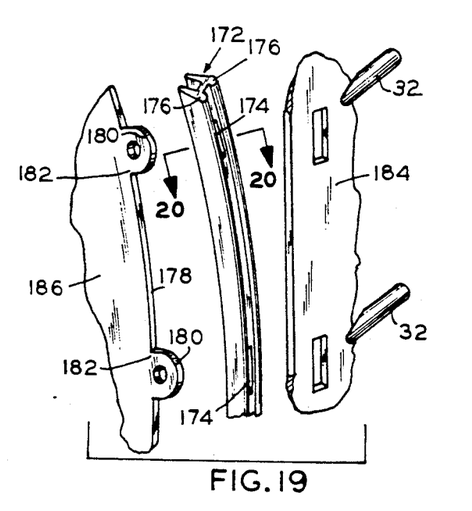
FIG. 19 illustrates an exploded perspective view of wall member attachment utilizing a U-shaped bead sealing strip applied to the side edge of a wall member having ear-like projections.
Figure 20:
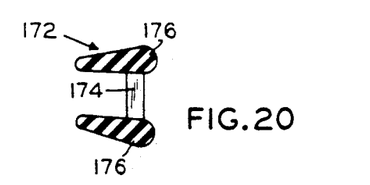
FIG. 20 illustrates a cross-sectional view of the bead sealing strip as seen at line 20—20 of FIG. 19.
Figure 21:
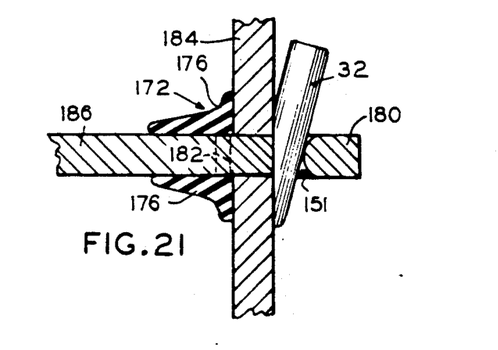
FIG. 21 illustrates a cross sectional view of the attachment of wall members of FIG. 19.

Means for sealing, against weather, the slots 16, 34, 72, 74, and 136, may be provided. As seen in FIGS. 17 and 18, for the slots 34, through which the projections 38 from the bed support beams 36 extend, an 0-ring type flexible sealing member 168 is installed at the outer face 170 of the beam 36 surrounding the projection 38 so that the sealing member 168 is pressed tightly against the first front or back wall member 20 or 22 by the locking action of the tapered peg 32. For the other junctures, such as where projections 24, 56, 68, 70, 132, penetrate slots 16, 72, 74, and 136, a flexible U-shaped bead sealing strip 172, having holes 174 formed therethrough to allow the projections 24, 56, 68, 70, 132, to extend therethrough between the beads 176, may be used. As seen in FIGS. 18–20 the bead sealing strip 172 is positioned along the edge 178 of the member having the projection 180, so as to form a seal along both sides of the edge 178 and surround each projection 180 at its base 182 as the slotted member 184 is pressed against it by the projection-carrying member 186 by the wedging action of the tapered peg 32.

Thus, as described above, a shelter 10 has been designed which may be transported in a disassembled condition in a standard size pickup bed, which utilizes lightweight components with no single component weighing over forty pounds, which may readily be assembled and disassembled in less than thirty minutes by one person, and which provides a comfortable, secure and sturdy shelter having an off-the-ground bed, storage shelving, and a table. The construction of the sturdy shelter 10 is significantly enhanced by the use of furniture elements, specifically the bed support beams 36, the table member 54 and the shelf member 62 to provide additional structural support.

It is thought that the shelter 10 of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A shelter, comprising:
 a. a first side wall member and a second side wall member, each having a first side edge, an opposing second side edge, a top edge and a bottom edge, wherein a plurality of vertically disposed slots are formed in series proximate both said first and second side edges of both said first side wall member and said second side wall member;
 b. a first front wall member and a first back wall member, each having a first side edge, an opposing second side edge, a top edge and a bottom edge, wherein a plurality of projections extend from said first side edges of said first front wall member and said first back wall member and are formed and positioned thereon to engage through said vertically disposed slots formed proximate said first and second side edges of said first side wall member; said projections each having a perforation formed therein, into which a tapered peg may be inserted;
 c. said first side wall member, said first front wall member, and said first back wall member, when having been interconnected by said projections extending through said slots, the insertion of said tapered pegs into said perforations of said projections securing the first front wall member and the first back wall member to said first side wall member, thereby forming a three-sided wall structure of a general U-shape;
 d. said first front wall member and said first back wall member each having a series of slots formed in a horizontal line interim the first side edge and the opposing second side edge, said slots in said first front wall member opposing said slots in said first back wall member;
 e. a plurality of elongated bed support beams, each having a projection opposingly extending from its two ends, such projections being formed with a perforation through which a tapered peg may be inserted;
 f. each said elongated bed support beam having its projections inserted through a slot formed in said first front wall member and an opposing slot formed in said first back wall member, and a tapered peg inserted into said perforations of said projections so as to secure the bed support beam into position against and between said first front wall member and said first back wall member, thereby providing support to said first front and back wall members; said beams being laterally spaced so as also to provide support for an off-the-ground bed within the shelter;
 g. a plurality of tapered pegs;
 h. a second front wall member and a second back wall member, each having a first side edge, an opposing second side edge, a top edge, and a bottom edge, wherein a plurality of projections extend along said first side edges of said second front wall member and said second back wall member and are formed and positioned thereon to engage through said vertically disposed slots formed proximate said first and second side edges of said second side wall member; said projections each having a perforation formed therein through which a tapered peg may be inserted;
 i. said second side wall member, said second front wall member and said second back wall member, when interconnected by said projections extending through said slots, and having tapered pegs inserted into said perforations of said projections so as to lock the second front wall member and the second back member to said second side wall member, thereby forming a second three-sided wall structure formed in a general U-shape;
 j. said second front wall member and said second back wall member each having at least one slot formed therethrough;
 k. an elongated horizontal member having a flat upper surface and having at least one projection extending from each of its two ends;
 l. said elongated horizontal member, having its projections inserted through slots in said second front wall member and said second back wall member and a tapered peg inserted into said perforation of said projections so as to lock the elongated flat horizontal member into position against and between said second front wall member and said second back wall member, thereby providing support to said second front and back wall members as well as a useful flat surfaced structure within the shelter;

m. a first center pole, having an upper end and a lower end, attached to and extending vertically along said second side edge of said second front wall member; and a second center pole, having an upper end and a lower end, attached to and extending vertically along said second side edge of said second back wall member;

n. a third front wall member and a third back wall member, each substantially triangular in shape, having a horizontal bottom edge, a vertical side edge, and a slanting side edge, the bottom side edge of the third front and back wall members being attached to the top side edge of the first front and back wall members, respectively, the second side edge of the first front wall member and the vertical side edge of the third front wall member forming a continuous side edge, and similarly, the second side edge of the first back wall member and the vertical side edge of the third back wall member also forming a continuous side edge, said continuous side edges abutting and being attached to said center poles which are attached to the second side edge of said second front and back wall members;

o. a top ridge pole, attached to said upper ends of said first and second center poles and extending horizontally therebetween; a side ridge pole, attached to the slanted sides of the third front and back wall members and extending horizontally therebetween; two eave poles, attached to the top edges of the first side wall member and the second side wall member; and a roof supported by said top ridge pole, side ridge pole, and eave poles;

p. said third front and back wall members having a window opening formed therein;

q. said second front wall member having a door opening formed therein;

r. bottom strips which are attached to the bottom edges of said first and second front, side, and back wall members, said bottom strips having holes formed therein so as to permit attachment of the shelter to a fixed ground location;

s. two planar bed members, the second planar bed member being a reflection of the first planar bed member, which are formed to lie upon said elongated bed support beams within the shelter, wherein a double bed may be formed to lie parallel and adjacent to said first side wall member or, alternatively, two single beds may be formed one lying parallel and adjacent to said first front wall member and the second lying parallel and adjacent to said first back wall member;

t. said tapered pegs being formed of a cylindrically shaped pin of a diameter substantially equal to the diameter of the perforation in the projection, wherein a first end of the cylindrically-shaped pin is tapered to a flat surface on one side, said first end formed to be inserted within said perforation, so that the flat-tapered side will engage and remain against a flat surface adjacent to the slot and the second end, a head, of the tapered peg will remain at a distance from a wall member being secured by a wedging effect of the tapered peg; and u. means for sealing against weather the slots formed in a wall member through which an projection is inserted:
  (1) wherein, where an elongated beam is used, an encircling flexible sealing member is installed between an outer end of the elongated beam and around the projection, which encircling flexible sealing member is pressed tightly against a wall member by the locking action of the tapered peg; and
  (2) wherein, where a wall-to-wall juncture is formed, a flexible strip, U-shaped in cross-section, and having at least one longitudinal aperture formed therein which allows a projection to extend therethrough to accept a tapered peg as the walls are set together, the U-shaped strip, when positioned along an edge of a wall member, thereby forming a seal along said edge and surrounding each said projection at its base.

2. A shelter, comprising:
a. at least one wall member having a plurality of slots formed in series proximate to an edge thereof;
b. at least one wall member having a plurality of projections extending outwards from an edge, said projections being formed and positioned on said edge to engage through said slots;
c. at least one elongated member, having at least one projection formed at each of its two ends, said elongated member joining two opposing wall members having slots formed and positioned to engage said projections; and
d. means of securing said projections within said slots which includes:
  (1) a perforation formed in the projection; and
  (2) a peg formed to be inserted into said perforation;
  (3) said peg, being formed of a cylindrically-shaped pin of a diameter substantially equal to the diameter of the perforation of the projection and having a first end tapered to a flat surface on one side, said first end being formed to be inserted within said perforation so that said flat tapered side wall engage a flat surface adjacent to the slot.

3. A shelter, as recited in claim 2, wherein said elongated member is a bed-supporting beam.

4. A shelter, as recited in claim 2, wherein said elongated member is a table.

5. A shelter, as recited in claim 2, wherein said elongated member is a shelf.

6. A shelter, as recited in claim 2, where there are means for sealing against weather the slots formed in a wall member through which a projection is inserted and where an elongated member is used, which means include an encircling flexible sealing member which is installed around the projection of the elongated member, said encircling flexible sealing member being pressed tightly against a wall member by said means of securing said projections within said slots.

7. A shelter comprising:
a. a first side wall member, having a first side edge, an opposing second side edge, a top edge and a bottom edge, wherein a plurality of vertically disposed slots are formed in series proximate both said first and second side edges of said first side wall member;
b. a first front wall member and a first back wall member, each having a first side edge, and opposing second side edge, a top edge, and a bottom edge, wherein a plurality of projections extend from said first side edges of said first front wall member and said first back wall member and are formed and positioned thereon to engage through said vertically disposed slots formed proximate said first and second side edges of said first side wall member; and projections each having a perforation formed therein, into which a tapered peg may be inserted;

c. a plurality of tapered pegs;

d. said first side wall member, said first front wall member, and said first back wall member being interconnected by said projection extending through said slots, the insertion of said tapered pegs into said perforations of said projections secures the first front wall member and the first back wall member to said first said wall member, thereby forming a first three-sided wall structure of a general U-shape;

e. a second side wall member, having a first side edge, and opposing second side edge, a top edge and a bottom edge, wherein a plurality of vertically disposed slots are formed in series proximate both said first and second side edges of said second side wall member;

f. a second front wall member and a second back wall member, each having a first side edge, an opposing second side edge, a top edge, and a bottom edge, wherein a plurality of projections extend from said first side edges of said second front wall member and said second back wall member and are formed and positioned thereon to engage through said vertically disposed slots formed proximate said first and second side edges of said second side wall member; said projections each having a perforation formed therein through which a tapered peg may be inserted;

g. said second side wall member, said second front wall member and said second back wall member being interconnected by said projections extending through said slots, and having tapered pegs inserted into said perforations of said projections so as to lock the second front wall member and the second back member to said second side wall member, thereby forming a second three-sided wall structure of a general U-shape which is capable of being joined to said first three-sided wall structure to form a rectangular wall structure.

8. A shelter, as recited in claim 7, which additionally includes:

a. said front wall member and said back wall member each having at least one slot formed therethrough;

b. a horizontal elongated member having a flat upper surface and at least one projection extending from each of its two ends;

c. said horizontal elongated member, having its projections inserted through said slots in said front wall member and said back wall member and a tapered peg inserted into said perforation of said projections so as to lock the horizontal elongated member int position against and between said front wall member and said back wall member, thereby additionally providing support to said front and back wall members as well as a useful flat surfaced structure within the shelter.

9. A shelter, comprising:

a. a first side wall member and a second side wall member, each having a first side edge, and opposing second side edge, a top edge and a bottom edge, wherein a plurality of vertically disposed slots are formed in series proximate both said first and second side edges of both said first side wall member and said second side wall member;

b. a first front wall member and a first back wall member, each having a first side edge, an opposing second side edge, a top edge, and a bottom edge, wherein a plurality of projections extend from said first side edges of said first front wall and member and said first back wall member and are formed an positioned thereon to engage through said vertically disposed slots formed proximate said first and second side edges of said first side wall member; said projections each having a perforation formed therein, into which a tapered peg may be inserted;

c. a plurality of tapered pegs;

d. said first side wall member, said first front wall member, and said first back wall member, being interconnected by said projections extending through said slots, the insertion of said tapered pegs into said perforations of said projections securing the first front wall member and the first back wall member to said first side wall member, thereby forming a first three-sided wall structure of a general U-shaped;

e. a second front wall member and a second back wall member, each having a first side edge, an opposing second side edge, a top edge, and a bottom edge, wherein a plurality of projections extend from said first side edges of said second front wall member and said second back wall member and are formed and positioned thereon to engage through said vertically disposed slots formed proximate said first and second side edges of said second side wall member; said projections each having a perforation formed therein through which a tapered peg may be inserted;

f. said second side wall member, said second front wall member and said second back wall member, being interconnected by said projections extending through said slots, and having tapered pegs inserted into said perforations of said projections so as to lock the second front wall member and the second back wall member to said second side wall member, thereby forming a second three-sided wall structure of a general U-shape; and g. a first center pole, having an upper end and a lower end, attached to and extending vertically along said second side edge of said second front wall member; and a second center pole, having an upper end and a lower end, attached to and extending vertically along said second side edge of said second back wall member.

10. A shelter, as recited in claim 9, which additionally includes:

a. said first front wall member and said first back wall member each having a series of slots formed in a horizontal line interim the first side edge and the opposing second side edge, said slots in said first front wall member opposing said slots in said first back wall member;

b. a plurality of elongated bed support beams, each having a projection opposingly extending from its two ends, such projections being formed with a perforation through which a tapered peg may be inserted; and c. each said elongated bed support beam having its said projections inserted through a slot formed in said first front wall member and an opposing slot formed in said first back wall member, and a tapered peg inserted into said perforations of said projections so as to secure the bed support beam into position against and between said first front wall member and said first back wall member, thereby additionally providing support to said first front and back wall members; said beams being laterally spaced so as to also to provide support for an off-the-ground bed within the shelter.

11. A shelter, as recited in claim 10, which additionally includes two planar bed members, the second planar bed member being a reflection of the first planar bed member, which are formed to lie upon said elongated bed support beams within the shelter, wherein a double bed may be formed to lie parallel and adjacent to said first side wall member or, alternatively, two single beds may be formed, one lying parallel and adjacent to said first front wall member and the second lying parallel and adjacent to said first back wall member.

12. A shelter, as recited in claim 9, which additionally includes:
   a. said second front wall member and said second back wall member each having at least one slot formed therethrough;
   b. a horizontal elongated member having a flat upper surface and at least one projection extending from each of its two ends;
   c. said horizontal elongated member, having its projections inserted through said slots in said second front wall member and said second back wall member and a tapered peg inserted into said perforation of said projections so as to lock the horizontal elongated member into position against and between said second front wall member and said second back wall member, thereby additionally providing support to said second front and back wall members as well as a useful flat surfaced structure within the shelter.

13. A shelter, as recited in claim 9, wherein, additionally, a top ridge pole is attached to said upper ends of said first and second center poles and extends horizontally therebetween for support of a roof.

14. A shelter as recited in claim 9, which additionally includes two third wall member, a third front wall member and a third back wall member, each substantially triangular in shape, having a horizontal bottom edge, a vertical side edge, and a slanting side edge, the bottom side edge of the third front and back wall members being attached to the top side edge of the first front and back wall members, respectively, so that the second side edge of the first front wall member and the vertical side edge of the third front wall member form a continuous side edge, and similarly, the second side edge of the first back wall member and the vertical side edge of the third back wall member also form a continuous side edge, said continuous side edges abutting and being attached to said center poles which are attached to the second side edge of said second front and back wall members.

15. A shelter, as recited in claim 14, which additionally includes a side ridge pole, attached to the slanted sided of the third front and back wall member and extending horizontally therebetween for support of a roof.

16. A shelter, as recited in claim 15, which additionally includes two eave poles, attached to the top edges of the first side wall member and the second side wall member.

17. A shelter, as recited in claim 16, wherein a roof is supported by said top ridge pole, said side ridge pole, and at least on said eave pole.

18. A shelter, as recited in claim 13, wherein a window opening is formed within a third wall member.

19. A shelter, as recited in claim 9, wherein a door opening is formed within said second front wall member.

20. A shelter, as recited in claim 9, wherein said tapered pegs are formed of a cylindrically shaped pin of a diameter substantially equal to the diameter of the perforation in the projection, a first end of the cylindrically-shaped pin being tapered to a flat surface on one side, said first end being formed to be inserted within said perforation, so that the flat-tapered side will engage and remain against a flat surface adjacent to the slot and the second end, a head, of the tapered peg will remain at a distance from a wall member being secured by a wedging effect of the tapered peg.

21. A shelter, comprising:
   a. a first side wall member and a second side wall member, each having a first side edge, an opposing second side edge, a top edge and a bottom edge, wherein a plurality of vertically disposed slots are formed in series proximate both said first and second side edges of both said first side wall member and said second side wall member;
   b. a first front wall member and a first back wall member, each having a first side edge, an opposing second side edge, a top edge, and a bottom edge, wherein a plurality of projections extend from said first side edges of said first front wall member and said first back wall member and are formed and positioned thereon to engage through said vertically disposed slots formed proximate said first and second side edges of said first side wall member; said projections each having a perforation formed therein, into which a tapered peg may be inserted;
   c. a plurality of tapered pegs;
   d. said first side wall member, said first front wall member, and said first back wall member, being interconnected by said projections extending through said slots, the insertion of said tapered pegs into said perforations of said projections securing the first front wall member and the first back wall member to said first side wall member, thereby forming a first three-sided wall structure of a general U-shape;
   e. a second front wall member and a second back wall member, each having a first side edge, an opposing second side edge, a top edge, and a bottom edge, wherein a plurality of projections extend from said first side edges of said second front wall member and said second back wall member and are formed and positioned thereon to engage through said vertically disposed slots formed proximate said first and second side edges of said second side wall member; said projections each having a perforation formed therein through which a tapered peg may be inserted;
   f. said second side wall member, said second front wall member and said second back wall member, being interconnected by said projections extending through said slots, and having tapered pegs inserted into said perforations of said projections so as to lock the second front wall member and the second back wall member to said second side wall member, thereby forming a second three-sided wall structure of a general U-shape; and
   g. bottom strips which are attached to the bottom edges of said first and second front, side, and back wall members, said bottom strips having holes formed therein so as to permit attachment of the shelter to a fixed ground location.

22. A shelter, comprising:
a. a first side wall member and a second side wall member, each having a first side edge, an opposing second side edge, a top edge and a bottom edge, wherein a plurality of vertically disposed slots are formed in series proximate both said first and second side edges of both said first side wall member and said second side wall member;
b. a front wall member and a back wall member, each having a first side edge, an opposing second side edge, a top edge, and a bottom edge, wherein a plurality of projections extend from said first side edges of said front wall member and said back wall member and are formed and positioned thereon to engage through said vertically disposed slots formed proximate said first and second side edges of said first side wall member; said projections each having a perforation formed therein, into which a tapered peg may be inserted;
c. a plurality of tapered pegs;
d. said first said wall member, said front wall member, and said back wall member, being interconnected by said projections extending through said slots, the insertion of said tapered pegs into said perforations of said projections securing the front wall member and the back wall member to said first side wall member, thereby forming a three-sided wall structure of a general U-shape; and
e. means for sealing against weather the slots formed in a wall member through which a projection is inserted and where a wall-to-wall junction is formed, which means include a flexible strip, U-shaped in cross-section, and having at least one longitudinal aperture formed therein which allows a projection to extend therethrough to accept a tapered peg as the walls are set together, the U-shaped strip, when positioned along an edge of a wall member, thereby forming a seal along said edge and surrounding each said projection at its base.

* * * * *